Patented Aug. 2, 1938

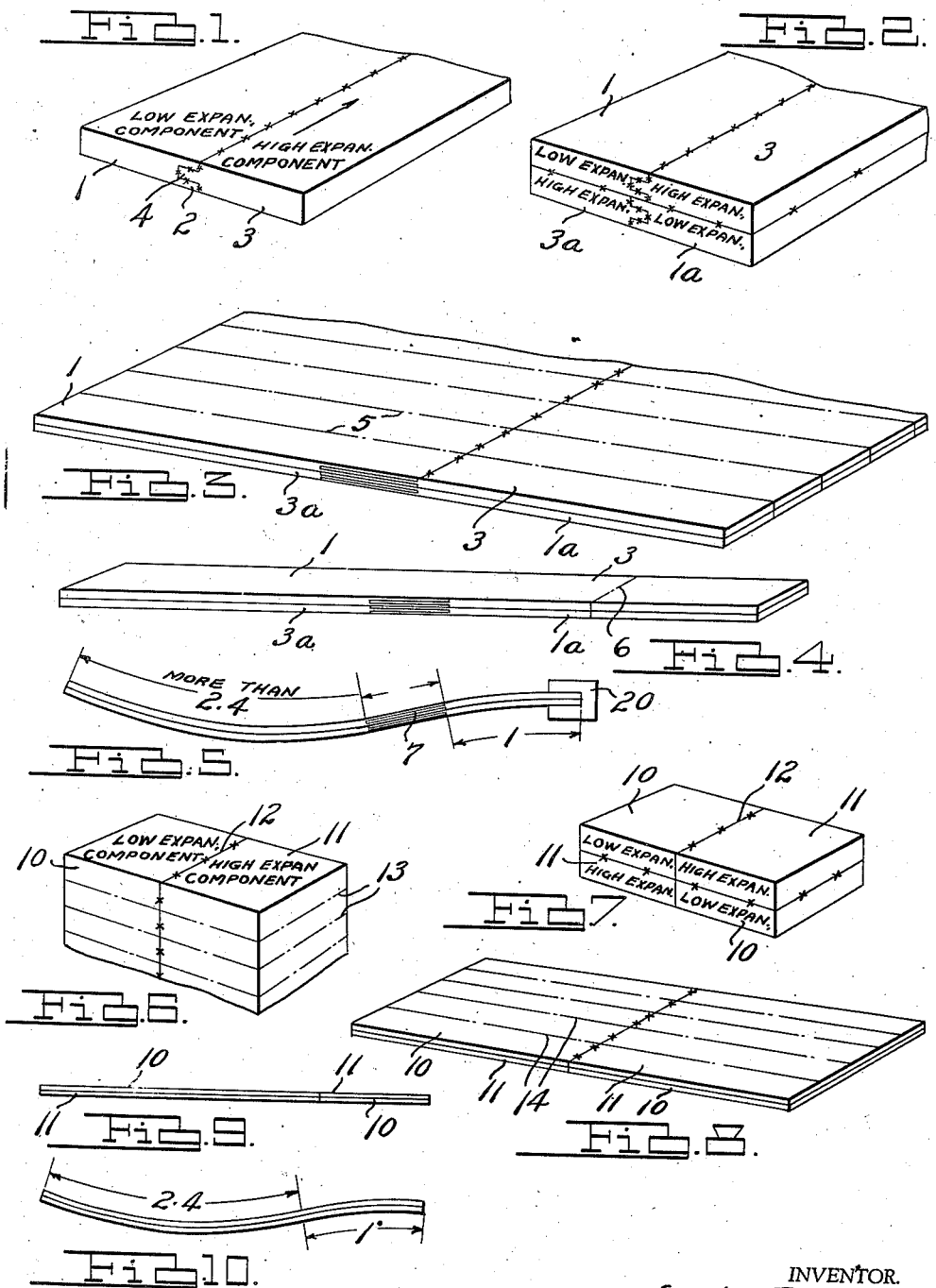

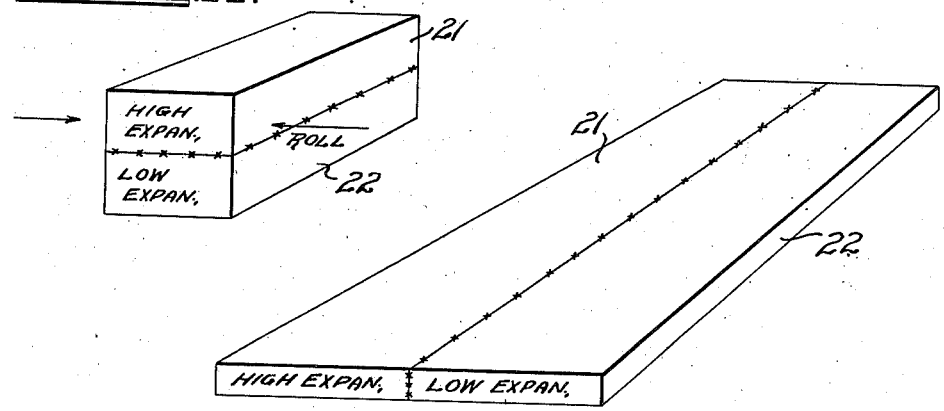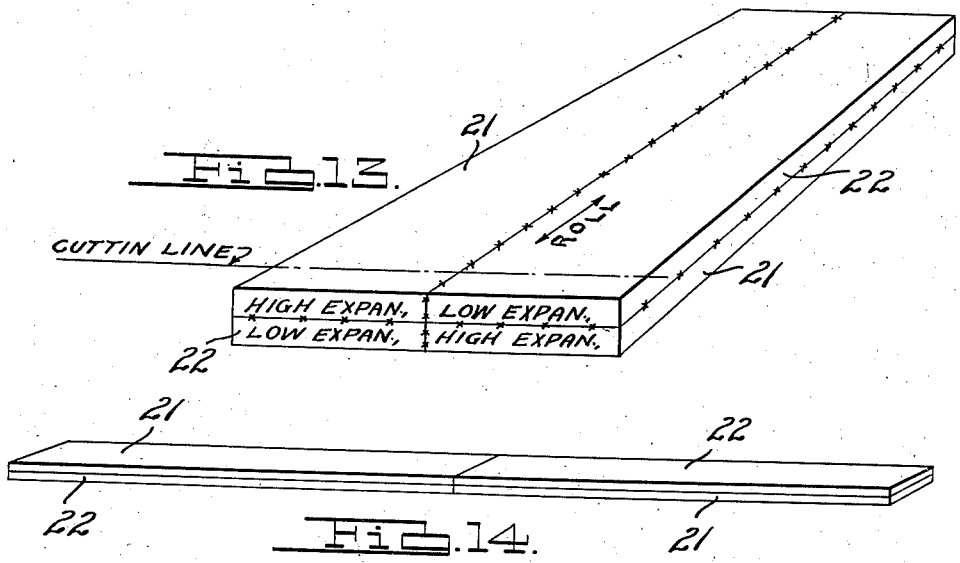

2,125,858

UNITED STATES PATENT OFFICE 2,125,858

METHOD OF MAKING COMPOUND BIMETALLIC ELEMENTS

Stanley R. Hood and Clarence F. Alban, Detroit, Mich.

Original application January 2, 1936, Serial No. 57,220. Divided and this application June 5, 1936, Serial No. 83,726

7 Claims. (Cl. 29—148)

This invention relates to a method of making bimetallic elements and is a division of our application for Letters Patent of the United States, Serial No. 57,220, filed January 2, 1936.

The object of the invention is to provide a method for forming a compound bimetallic element of two blades, the thermal deflections of which are in opposite directions. The action of such compound blades differs fundamentally from that of the usual single blade in that it functions due to difference in temperature of its components instead of the total temperature change.

The uses of such compound blades are to compensate for ambient temperature changes and to correct errors in calibration due to thermal lag.

It has heretofore been common to form a compound blade by riveting or welding two separate and distinct blades together at one end. This invention distinguishes from such former construction in that by the method of manufacture, a compound blade is provided that is of a uniform width and thickness throughout its length avoiding the unsightly double thickness and rivet at the weld of the former construction. In one of the methods of construction hereinafter described, the "dead" section of such previously lapped, riveted or welded compound blades is avoided.

It is therefore the purpose and object of this invention to not only simplify but to provide a method of construction that is comparatively simple and inexpensive and resulting in a blade of superior appearance and greater accuracy in comparison with former compound blades.

These and other objects and the several novel features of the invention are hereinafter more fully described and claimed, and the preferred form of blade and manner of constructing the same is illustrated in the accompanying drawings in which—

Fig. 1 is a fragmentary perspective of two blocks of metal of a high and a low expansion component respectively.

Fig. 2 is a similar view showing the assembly of a pair of such blocks or strips welded together by the ordinary welding process providing a block from which the thermostatic blades may be produced by rolling and then slitting to the desired size.

Fig. 3 is a perspective view of the blocks of Fig. 2 rolled to a desired thinness.

Fig. 4 is a perspective view of a completed blade as cut from the rolled stock along the line 5 shown in Fig. 3.

Fig. 5 is an edge view showing the thermostatic blade of Fig. 4 under influence of temperature and showing the shape of the blade with a correct ratio of active length of each blade which, when heated uniformly, will give zero deflection at the free end.

Fig. 6 is a perspective view of two blocks of metal, one of low expansion component and the other of high expansion component welded together and adapted to be severed on the dotted lines to provide blocks.

Fig. 7 shows blocks cut from the stock of Fig. 6 and so welded together that the low expansion element of each block is opposite the high expansion element of the other.

Fig. 8 is a perspective view showing the blocks when rolled to the desired thinness.

Fig. 9 is an edge view of a completed blade cut from the sheet Fig. 8.

Fig. 10 is an edge view showing the shape assumed by the blade under temperature to which both components of the block are subjected.

Fig. 11 is a perspective view showing two blocks, one of a high expansion coefficient and the other of a low expansion coefficient welded together in a manner providing another method of manufacture of a bimetallic element.

Fig. 12 is a perspective view of the form assumed by the blocks when rolled at ninety degrees to the welded surface of Fig. 11.

Fig. 13 is a perspective view showing two strips like that of Fig. 12 superimposed one upon the other with the high expansion element of each welded to the low expansion element of the other strip.

Fig. 14 shows the compound bimetallic blade formed by cutting transversely of the welded strips shown in Fig. 13.

The function of the single thermostatic bimetallic blade is well known, the blade having a metal of high coefficient of expansion welded to a metal of a low coefficient of expansion whereby temperature change tends to deflect the blade and when held at one end to make or break a contact in an electric circuit for instance, or the movement of the free end may be utilized in other ways.

With a compound blade such as herein disclosed, the two blades function to maintain the contact closed through ambient temperature change as the movement of one part of the blade may compensate for the movement of the other part and where the blade is used, for instance with a pilot light playing upon one of the elements of a compound blade, the two elements of the blade function to prevent deflection due to the temperature change in the surrounding space.

There are many uses well known in the art in which our improved compound thermostatic bimetal blade may be utilized and the invention herein described resides in the construction of the blade and the method by which the blade may be manufactured.

The usual bimetallic blade has one side of a metal of low coefficient of expansion to which is secured, as by welding or otherwise, an element of a high coefficient of expansion and so far as this invention is concerned, the compositions of the respective blades are not material as they may be varied considerably for different purposes which are well known to persons skilled in the art. Thus, so far as this invention is concerned, the one element is termed the "low expansion side" and the other element the "high expansion side".

In the manufacture of our improved bimetallic blade, we form a block or strip of a metal having a low expansion coefficient indicated at 1 in Fig. 1 which we preferably form with the groove 2 in one side edge. We also provide a similar strip or block of metal having a high expansion component indicated at 26w which has a tongue 4 at one edge for engaging in the groove 2 of the low expansion element 1. The grain of the metal in both strips or blocks is in the direction of the arrows shown in Fig. 1.

The blocks or strips are preferably of the same width and two strips such as shown in Fig. 1 may be superimposed one upon the other in the manner indicated in Fig. 2 and the meeting surfaces of these strips are welded by applying pressure thereto while at welding temperature in the usual manner of making standard bimetal blades. With this arrangement, the low expansion side 1 of one pair of the strips is welded to the high expansion member 3ª of the other pair and the high expansion side 3 of the first pair is welded to the low expansion side 1ª of the second pair. The blocks or strips thus welded together in the manner shown in Fig. 2 are then submitted to the rolling operation and by repeated passes through the rolls, the strips are reduced to the desired thinness suggested in Fig. 3, the tongue and groove portions being elongated as may be seen in edge view in Fig. 3. This sheet, when rolled to the desired thinness, may be cut along the lines 5 to form blades of the desired width as indicated in Fig. 4.

The compound blade shown has equal length of the two elements but for some purposes one element may be shortened by cutting on the line 6 of Fig. 4 to form a blade of the character shown in edge view in Fig. 5. By varying the ratio of length of each part of the blade and by proper selection of the alloys used having the necessary physical properties, a compound bimetallic blade having peculiar characteristics can be made.

As an example, a blade having certain peculiar characteristics may be produced by using invar for the element 1 of Fig. 2 and 42 per cent nickel-iron alloy for the element 1ª of Fig. 2 and 60 per cent nickel-iron alloy for the high expansion side 3 and 22 per cent nickel 3 per cent chrome-iron alloy for the other high expansion side 3ª and by correctly varying the lengths of the two sections of the blade, an element can be produced which will have practically no deflection below 350 degrees Fahrenheit but will begin to deflect above this temperature. Other compositions may be used, such for instance as a chromium-nickel iron strip mounted in reverse relation with an invar-pure nickel strip. Such compound blade may be used for electrical devices, the components being of different electrical resistivities. Such blade will not deflect at room temperature variations but will deflect with overload currents.

The blade so far described has a "dead" section at 7 in Fig. 5 and the ratio of the length of the parts of the blade to produce zero movement is 1 for the part at the right of the dead section while the part at the left thereof must be more than 2.4 times the length of the other part. An increase in length of the dead section increases the ratio of the longer portion to the shorter portion and vice versa. What we have termed the "dead" section is the point from which the active length of the longer blade begins thereby requiring a longer active length to return or hold the free end to zero position, it being assumed in the above discussion that the blade is supported at the short end as indicated at 20 in Fig. 5.

To make a compound blade without a dead section between the two parts thereof, we provide a block 10 of a composition having a low expansion coefficient and a block 11 of a composition having a high expansion coefficient which may be welded together at the meeting surface 12. The block has been so welded that it may be cut along the lines 13 to provide a series of blocks of the desired thickness and these blocks may be superimposed one upon the other as indicated in Fig. 7 with the low expansion side of one block 10 opposite the high expansion element 11 of the other block. These are then welded together at the meeting surfaces and rolled to form a sheet shown in perspective in Fig. 8 and in edge view in Fig. 9. Such compound blade will not have a dead section and, to provide a blade having zero movement, the ratio should be 1 for the short side to 2.4 for the long side approximately as indicated in Fig. 10. In making the blade from rolled stock it is cut across the grain along the lines 14.

The method of formation of the improved compound bimetallic blade is approximately the same in both instances illustrated—that is, a block of the low expansion side and of the high expansion side are placed in edge to edge contact and in reverse relation to a similar pair of strips or blocks. These are welded together at the meeting surfaces, rolled to the desired thinness and severed across the grain to provide the compound bimetallic element of the desired width and before or after rolling one side of the compound block or rolled sheet may be cut to the required length in respect to the length of the other side to secure a blade that will have zero deflection under temperature change to which both parts of the blade are subjected and by varying the length of one in respect to that of the other, deflection may be produced at any desired point. This, as before stated, can be accomplished through a choice of the components of the respective high and low sides of the two bimetal elements forming the blade.

There is another and possibly superior method of making a compound bimetallic blade which is indicated in Figs. 11 to 14 inclusive. In this method two rectangular blocks 21 and 22 each being respectively of the desired components and having a thickness preferably about one-half the width of the finished blade are welded together along their greatest surfaces by any approved welding method. This produces a block substantially square in cross section as shown in Fig. 11. This block or bar of Fig. 11 is then rolled at ninety degrees to the welded surface to a convenient thickness as shown in Fig. 12 and cut to the desired length. The two previously superimposed pieces of the respective high and low expansion components now appear in strips in a side by side relationship and two such strips shown in Fig. 12 are then superimposed one upon the other with the high expansion side 21 of each of the strips being welded to the low expansion side 22 of the other strip. These two superimposed strips are then rolled longitudinally as indicated by the arrow in Fig. 13 to the desired finished thickness of the bimetallic blade and finally is cut across the grain to form compound bimetallic blades indicated in Fig. 14. This method is less expensive and is preferable as the material is a little more readily handled in the usual rolling operations.

The foregoing description is largely confined to bimetallic devices in which there is a constant difference in expansion coefficient under temperature change. It is pointed out, however, that to obtain certain deflection characteristics for some special application or installation, it is possible to use combinations of metals which have the same temperature coefficient of expansion in one temperature range and different expansion rate in another. It is further to be understood that, within the scope of this invention, it is also possible to provide a finished compound blade consisting partly of bimetal and partly of a single metal, as spring material. Therefore the terms "high expansion" and "low expansion" as herein used are to be considered only as convenient descriptive terms. In practice it is further possible to provide a compound blade by either of the methods herein disclosed in which the superimposed sections have the same expansion coefficient, either in all temperature ranges or in a limited temperature range only and as such latter character of bimetallic blades are well known to those skilled in the art, compositions productive of such structures are not specifically given.

It is believed evident from the foregoing description that, by either of the methods of manufacture described, a compound bimetallic element is provided that is of uniform thickness throughout its length having the appearance of a single bimetallic element and avoiding the ungainly appearance of the prior compound bimetallic blades having the welded and riveted ends and lessening the cost of construction of the same and securing a blade that is of greater accuracy in its operation than previously known compound bimetallic blades.

Having thus fully described our invention, its utility and mode of operation, what we claim and desire to secure by Letters Patent of the United States is—

1. The method of manufacture of a compound bimetallic thermostat which consists in providing two blocks, one having a low expansion coefficient and the other a high expansion coefficient, forming a tongue in the edge of one of the blocks to seat in a groove in the edge of the other to form a compound block, uniting two such compound blocks in a superimposed relationship with the elements of low expansion coefficient of each component block opposed to the element of high expansion coefficient of the other, and rolling the assembled blocks to form a sheet of the desired thickness, and to elongate the tongue and groove portion providing a thermally unresponsive section between two thermally responsive sections of opposite deflection.

2. The method of manufacture of a compound bimetal thermostat which consists in providing a bimetallic blade of rectangular form having a high expansion component secured to a low expansion element of the same form, welding such block in edge relationship with another block having its high expansion component on the same side of the assembled blocks as the low expansion component of the first block, the two elements of the second block respectively differing in expansion coefficients from the elements of the first block, rolling the assembled blocks to provide a sheet of the thickness required in the thermostat, and finally cutting the sheet into strips to provide the desired width of a thermostatic blade.

3. The method of manufacture of a compound bimetallic thermostat consisting in providing two bimetallic blocks of rectangular form and the same thickness, welding the same together in edge to edge relationship with the high expansion component of one of the blocks on the same side of the assembled pair of blocks as the low expansion element of the other block, rolling the said blocks to provide a sheet of the desired thinness, and cutting the block transversely of the welded edge into strips to provide a blade of the desired width and length and having zero deflection when uniformly heated.

4. The method of forming a compound bimetallic thermostat which consists in welding a block of a composition having a high coefficient of expansion to a block of like form having a low coefficient of expansion, cutting the welded pair of blocks into a series of blocks of equal thickness, welding one of the cut blocks face to face with another with the elements of low coefficient of expansion of each cut and welded block respectively opposed to the elements of high coefficient of expansion of the other block, hot rolling the pairs of blocks to provide a sheet of the desired thickness, and severing the sheet to provide a blade of the desired width.

5. The method of forming a compound bimetallic thermostat which consists in welding a block of a composition having a high coefficient of expansion to a block of like form having a low coefficient of expansion, cutting the welded pair of blocks into a series of blocks of equal thickness, welding one of the cut blocks face to face with another with the elements of low coefficient of expansion of each cut and welded block respectively opposed to the elements of high coefficient of expansion of the other block, hot rolling the pairs of blocks to provide a sheet of the desired thickness, and cutting a portion from one edge of the sheet parallel with the weld line to form a sheet having a long and a short side, and severing the sheet transversely of the weld line to provide a bimetallic thermostat of the desired width.

6. The method of forming a compound bimetallic blade which consists in welding together two blocks of the desired form in cross section and length, one having a high expansion coefficient and the other having a low expansion coefficient, then rolling the blocks at an angle of ninety degrees to the welded surface thereof to produce a comparatively thin and long strip with the material of the low coefficient of expansion on one side and the material of the high coefficient of expansion on the other, then welding two such strips together with the high expansion element of each strip welded to the low expansion element of the respective other strip, and then rolling the welded strips to secure a blade of the desired finished thickness, and finally cutting across the grain at a right angle to the direction of rolling to form a compound bimetallic blade of the desired dimensions.

7. The method of forming a compound bimetallic blade which consists in welding together two rectangular blocks, one being a metallic composition having a high coefficient of expansion and the other of a metallic composition having a low coefficient of expansion, then rolling the welded blocks at an angle of ninety degrees to the welded surface thereof to produce a comparatively thin and long strip, then welding two such strips together with the high expansion element of each strip opposite the low expansion element of the respective other strip, then rolling the welded strips longitudinally to secure a blade of the desired finished thickness, and finally cutting the rolled strip transversely to provide compound bimetallic blades of the desired width.

STANLEY R. HOOD.
CLARENCE F. ALBAN.